United States Patent

[11] 3,633,071

[72] Inventors Alfons Fendt
Erlangen;
Eckart Maenicke, Berlin, both of Germany
[21] Appl. No. 87,454
[22] Filed Nov. 6, 1970
[45] Patented Jan. 4, 1972
[73] Assignee Siemens Aktiengesellschaft
Berlin and Munich, Germany
[32] Priority Nov. 11, 1969
[33] Germany
[31] P 19 56 527.6

[54] DIFFERENTIAL PROTECTIVE CIRCUIT
5 Claims, 3 Drawing Figs.

[52] U.S. Cl. .................................................. 317/26,
307/131, 317/53, 340/253 N
[51] Int. Cl. ................................................ H02h 3/26
[50] Field of Search .......................................... 317/26, 36
TD, 53; 307/131; 340/253 H, 253 N

[56] References Cited
UNITED STATES PATENTS
2,861,222 11/1958 Hodtum ....................... 317/26 X
3,259,802 7/1966 Steen ............................ 317/26 X
3,573,552 4/1971 Forfod .......................... 317/26

*Primary Examiner*—James D. Trammell
*Attorneys*—Curt M. Avery, Arthur E. Wilfond, Herbert L. Lerner and Daniel J. Tick

ABSTRACT: The outputs of a system to be protected are connected to current transformers. A summing circuit is connected to the secondary winding of the current transformers and produces the algebraic sum of the currents flowing in the system to be protected and provides an electrical magnitude derived from such sum to an indicator. The indicator produces an output signal which controls circuit breakers or the like in order to disconnect the system to be protected.

DIFFERENTIAL PROTECTIVE CIRCUIT

DESCRIPTION OF THE INVENTION

The invention relates to a differential protective circuit. More particularly, the invention relates to a circuit for protecting an electrical system from overload.

In the differential protective circuit of the invention, the outputs of a system to be protected are connected to current transformers. The system to be protected may comprise an electrical circuit, an electrical line, an electrical machine, an electrical transformer, a bus bar, or the like. The secondary windings of the current transformers are connected to a summing current which produces the algebraic sum of the currents flowing in the system to be protected. The summing circuit provides an electrical magnitude derived from the sum of the currents to an indicator which is connected thereto. The indicator comprises a threshold or limit circuit, relay circuit, or the like. The indicator produces an output signal which controls the circuit breakers to disconnect the system to be protected.

A differential protective circuit may be utilized to protect electrical systems, components and lines by connecting the electrical outputs of such a system to current transformers. The secondary currents of the current transformers are detected to determine whether the sum of the currents flowing into the system to be protected equals zero, in accordance with Kirchhoff's laws. Theoretically, this prerequisite occurs in a fault-free condition only if the inherent capacitance of the system to be protected is negligible and if the current transformers utilized correctly transform the current flowing in the primary circuit with regard to magnitude and phase.

Since the aforedescribed requirements are not met in practical application, the known differential protective circuits are provided with a stabilizing circuit in order to prevent faulty or erroneous release. In a two-pole differential protective circuit, the stabilizing circuit produces a current which acts upon the differential protective relay in a direction opposite that of the release current. In a two-pole differential protective circuit, the stabilizing current is proportional to the current flowing through the system to be protected. Thus, during the course of an external short circuit, the differential protective circuit becomes less sensitive upon an increase in the short circuit current. In a multipole differential protective circuit such as, for example, transformers having three windings and bus bars having several branches, the stabilizing current is the sum of the currents flowing into the system to be protected.

In known differential protective circuits, the release current and the stabilizing current are rectified and act in mutually opposed directions upon a differential protective relay or indicator operating without contacts. It is therefore necessary, in order to insure a correct indication of the locality of the fault, to provide the median value of the oppositely rectified currents. This sets an inevitable limit for the reduction of the release period. The utilization of rapid contact-free indicators insures that the differential protective circuit responds to the instantaneous magnitude of the release and blocking current. If there are transformer errors, due to the saturation, for example, it is quite feasible that at a specific time, the instantaneous magnitude of the blocking current is just relatively high, so that a contact-free indicator electrically connected to the comparison circuit would respond, although the fault or error is outside the protective range.

The principal object of the invention is to provide a new and improved differential protective circuit.

An object of the invention is to provide a differential protective circuit which overcomes the disadvantages of similar circuits of known type.

An object of the invention is to provide a differential protective circuit of great sensitivity.

An object of the invention is to provide a differential protective circuit which is of simple structure, but operates with efficiency, effectiveness and reliability.

An object of the invention is to provide a differential protective circuit wherein an indication or measurement is provided in accordance with the instantaneous magnitudes of the sum current and, as the case may be, of the blocking current, produced in the differential protective circuit.

In accordance with the invention, an indicator is electrically connected to the input of a circuit switch which is connected to the outputs of limit circuits via an OR gate. The inputs of the limit circuit are connected to the secondary windings of saturable current transformers via corresponding circuitry. The indicator measures the transformer saturation so that the circuit switch is opened when a transformer becomes saturated. The mode of operation of the differential protective circuit of the invention is thus determined by the fact that even in overloaded transformers which are operated in the saturated range, the flow of current will sometimes fall below the saturation point. This fact is particularly utilized, so that prior to the onset of the fault, all the transformers are nonsaturated and thus transform correctly. Hence, if, in the differential protective circuit of the invention, the indicator is also affected or controlled by a blocking current, in addition to the release current, as in known differential protective circuits, the influence of the blocking circuit may be considerably reduced, compared to the known differential protective circuit. The differential protective circuit of the invention is thus considerably more sensitive, even when there is a blocking current which opposes the release current, than a differential protective circuit which produces a determination by integration of the instantaneous magnitudes of the release current and the blocking current over several periods.

A harmonic filter may be connected to the secondary circuit of a current transformer to assist in measuring the transformer saturation. A limit circuit is connected to the output of the harmonic filter. The limit circuit responds when the harmonics produced in the secondary winding of the transformer exceed a specific magnitude. The high-harmonic content which occurs at the onset of transformer saturation may then be utilized in the secondary circuit of the transformer in order to measure or indicate the instant of onset of the transformer saturation.

In accordance with the invention, a differential protective circuit for a system to be protected comprises a plurality of saturable current transformers having secondary windings and primary windings connected to outputs of the system to be protected. Summing means connected to the secondary windings of the current transformers produces the algebraic sum of the currents flowing into the system to be protected and provides an electrical magnitude in accordance with the sum. Indicator means has an input electrically connected to the summing means and an output for providing an output signal at its output for disconnecting the system to be protected from a power supply in accordance with the electrical magnitude. Circuit means connected to the secondary windings of the current transformers indicates transformer saturation and includes limit circuit means. A first circuit switch connected to the output of the indicator means controls the provision of the output signal of the indicator means for disconnecting the system to be protected. First switch control means connected to the limit circuit means of the circuit means controls the conductivity condition of the first circuit switch. The first switch control means includes OR gate means connected between the limit circuit means and the first circuit switch for switching the first circuit switch to its nonconductive condition when one of the current transformers becomes saturated.

The circuit means comprises a plurality of integrating circuits each connected to the secondary winding of a corresponding one of the current transformers and a plurality of limit circuits each connected to a corresponding one of the integrating circuits. Each of the current transformers provides a corresponding one of the integrating stages with an electrical magnitude proportional to the voltage of the secondary winding thereof. Each of the limit circuits of the circuit means has a response magnitude adjusted in accordance with the permissible limit value of the voltage integral relative to time and determined by the onset of transformer saturation. The circuit means includes a plurality of filters each connected between the secondary winding of a corresponding one of the current transformers and a corresponding one of the limit circuits for filtering out harmonics.

Additional circuit means connected to the secondary windings of the current transformers differentiates signals in the secondary windings. The additional circuit means includes additional limit circuit means. A second circuit switch is connected between the summing means and the input of the indicator means for controlling the provision of the electrical magnitude to the indicator means. Second switch control means connected to the limit circuit means of the additional circuit means controls the conductivity condition of the second circuit switch. The second switch control means includes additional OR gate means connected between the limit circuit means and the second circuit switch for switching the second circuit switch to its conductive condition in accordance with the differential quotient of the secondary current of the current transformers. The additional circuit means comprises a plurality of differentiating circuits each connected to the secondary winding of a corresponding one of the current transformers and a plurality of additional limit circuits each connected to a corresponding one of the differentiating circuits.

In order that the invention may be readily carried into effect, it will now be described with reference to the accompanying drawing, wherein.

In the FIGS., the same components are identified by the same reference numerals.

Figure 1:
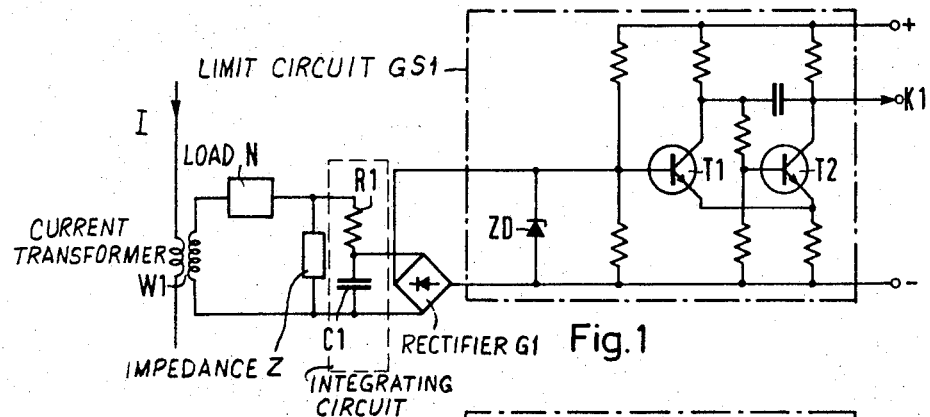
FIG. 1 is a circuit diagram of an embodiment of a circuit for measuring or indicating transformer saturation.

The circuit arrangement of FIG. 1 indicates or measures transformer saturation and produces an output signal even prior to the onset of transformer saturation. The circuit arrangement of FIG. 1 comprises a threshold or limit circuit having an integrating circuit connected in its input. The secondary winding of a current transformer W1 is connected in series with the load and an imaging or substitute impedance Z. The imaging impedance Z is proportional to the entire impedance defining the load of the current transformer W1. Since the imaging impedance Z is proportional to the entire impedance defining the load of the transformer W1, a voltage appears at said impedance and is proportional to the voltage of the secondary winding of the transformer W1.

An ohmic resistor R1 and a capacitor C1 are connected in series circuit arrangement. The series circuit arrangement R1, C1 is connected in parallel with the impedance Z. The resistor R1 and the capacitor C1 function as an integrating circuit. The voltage drop occurring at the capacitor C1 is proportional to the integral of the voltage at the secondary winding of the transformer W1 and is rectified by a rectifier G1. The rectifier G1 is a full wave rectifier circuit such as, for example, a Graetz circuit.

A threshold circuit or limit circuit GS1 has an input connected to the DC output terminals of the rectifier G1. The limit circuit comprises a known limit circuit and thus may consist, for example, of two transistors T1 and T2, connected as shown in FIG. 1. The limit circuit GS1 produces an output voltage at an output terminal K1 when the input voltage exceeds a predetermined magnitude or limit. The limit circuit GS1 includes a Zener diode ZD, connected in parallel with the DC output terminals of the rectifier G1, in the input of said limit circuit. The Zener diode ZD provides the control voltage of the transistor T1 of the limit circuit GS1.

Figure 2:
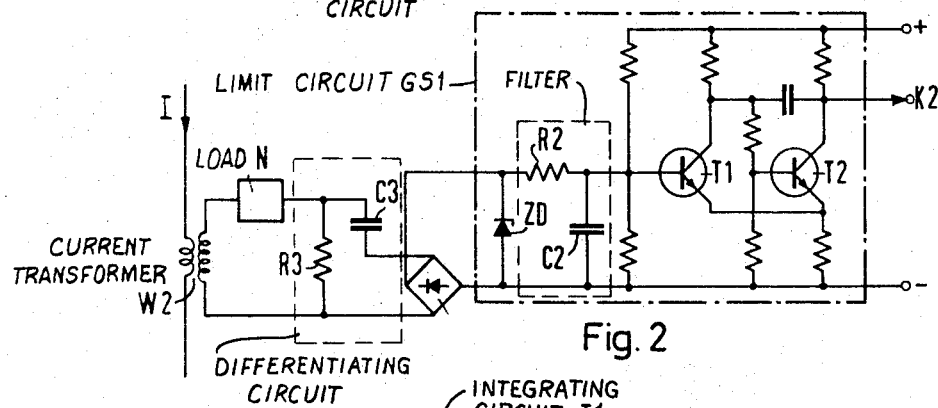
FIG. 2 is a circuit diagram of an embodiment of a circuit for rapidly indicating the onset of a short circuit.

The circuit arrangement of FIG. 2 rapidly determines or indicates the onset of a short circuit. The circuit arrangement of FIG. 2 utilizes the rate of change of current in the current transformer W2. A resistor R3 is connected in the secondary circuit of the current transformer W2. The AC input terminals of a full wave rectifier G2 are connected in parallel with the resistor R3. A capacitor C3 is connected in series between one end of the resistor R3 and one of the AC input terminals of the rectifier G2.

The resistor R3 and the capacitor C3 function as a differentiating circuit. The rectifier G2 thus produces at its DC output terminals a current proportional to the differential quotient of the current in the transformer W2. The current at the DC output terminals of the rectifier G2 produces an input voltage for a threshold circuit or limit circuit GS2, due to the internal resistance of said limit circuit. When the input voltage of the limit circuit GS2 exceeds a specific predetermined magnitude, level, threshold, or the like, the limit circuit GS2 produces an output voltage at an output terminal K2.

Voltage peaks are reduced or smoothed by a filter connected in the input of the limit circuit GS2. The filter comprises a Zener diode ZD connected in parallel with the DC output terminals of the rectifier G2. An RC circuit is connected to the Zener diode ZD. The RC circuit comprises a resistor R2 and a capacitor C2 connected in series circuit arrangement with each other; the series circuit arrangement being connected in parallel with the Zener diode ZD. The capacitance of the capacitor C2 is so small that there are no appreciable delays during the transfer of the input signal.

The limit circuits GS1 and GS2 are of the same structure, with the exception of the filter added to the limit circuit GS2. The limit circuits GS1 and GS2 constitute known circuitry and are therefore not described herein.

Figure 3:
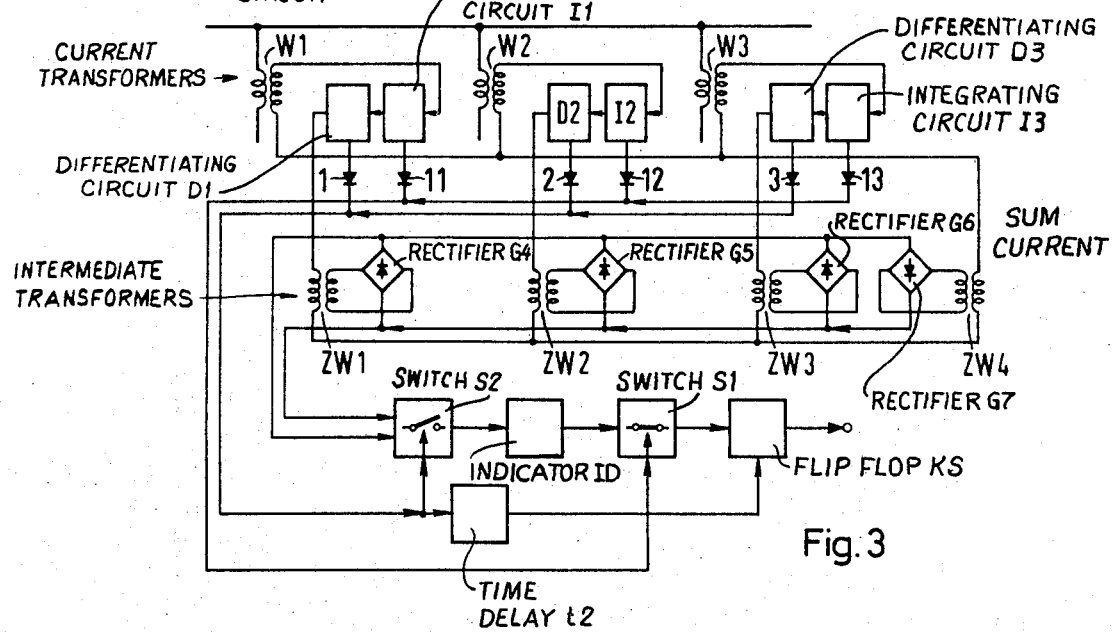
FIG. 3 is a block diagram of an embodiment of the differential protective circuit of the invention.

FIG. 3 comprises a plurality of differentiating circuits D1, D2 and D3 and a plurality of integrating circuits I1, I2 and I3. Each of the differentiating circuits D1, D2 and D3 of FIG. 2 comprises the differentiating circuit and limit circuit of FIG. 2. Each of the integrating circuits I1, I2 and I3 of FIG. 3 comprises the integrating circuit and limit circuit of FIG. 1. Each of the differentiating circuits D1, D2 and D3 indicates or measures a fault and each of the integrating circuits I1, I2 and I3 indicates or measures the voltage integrals of the secondary windings of the current transformers W1, W2 and W3.

As is known differential protective circuits, the secondary winding of the current transformer W1 is connected to the primary winding of an intermediate transformer ZW1. The secondary winding of the intermediate transformer ZW1 is closed via the AC input terminals of a full wave rectifier G4. The secondary winding of the current transformer W2 is connected to the primary winding of an intermediate transformer ZW2. The secondary winding of the intermediate transformer ZW2 is closed via the AC input terminals of a full wave rectifier G5. The secondary winding of the current transformer W3 is connected to the primary winding of an intermediate transformer ZW3. The secondary winding of the intermediate transformer ZW3 is closed via the AC input terminals of a full wave rectifier G6.

The DC output terminals of the rectifiers G4, G5 and G6 are connected in parallel with each other and in antiparallel with the DC output terminals of a fourth full wave rectifier G7. The AC input terminals of the rectifier G7 are connected to and close the secondary winding of a fourth intermediate transformer ZW4. The primary winding of the intermediate transformer ZW4 is connected in a circuit which conducts the sum of the secondary currents of the current transformers W1, W2 and W3.

The input of the integrating circuit I1 is connected to one end of the secondary winding of the current transformer W1. An output of the integrating circuit I1 is connected to the input of the differentiating circuit D1. An output of the differentiating circuit D1 is connected to one end of the primary winding of the intermediate transformer ZW1. An input of the integrating circuit I2 is connected to one end of the secondary winding of the current transformer W2. An output of the integrating circuit I2 is connected to the input of the differentiating circuit D2. An output of the differentiating circuit D2 is connected to one end of the intermediate transformer ZW2. An input of the integrating circuit I3 is connected to one end of the secondary winding of the current transformer W3. An output of the integrating circuit I3 is connected to the input of the differentiating circuit D3. An output of the differentiating circuit DC is connected to one end of the primary winding of the intermediate transformer ZW3.

Another output of each of the integrating circuits I1, I2 and I3 are connected in parallel and another output of each of the differentiating circuits D1, D2 and D2 are connected in parallel. The parallel connection of the outputs of the differentiating circuits D1, D2 and D3 are connected in parallel via diodes 1, 2 and 3, respectively, and the outputs of the integrating circuits I1, I2 and I3 are connected in parallel via diodes 11, 12 and 13, respectively. The combined outputs of the differentiating circuits D1, D2 and D3 are connected to a switch S2 in a manner whereby they control the operation of said switch.

The switch S2 is connected to the outputs of the rectifiers G4, G5, G6 and G7. The outputs of the rectifiers G4, G5 and G6 are connected in parallel with each other and the combined output of said rectifiers is connected to the input of the switch S2. In the case of the rectifier G7, of course, the outputs are connected in antiparallel with the outputs of the rectifiers G4, G5 and G6, and combined with said outputs. The output of the circuit switch S2 is connected to the input of an indicator ID. The indicator ID comprises any suitable indicator such as, for example, a limit circuit, relay circuit, or the like. The differentiating circuits D1, D2 and D3 control the operation of the circuit switch S2, so that when one or more of the differentiating circuits D1, D2 and D3 produces an output signal via the corresponding one of the diodes 1, 2 and 3, said switch is switched to its closed or conductive condition. The circuit S2 is normally open or in nonconductive condition.

The combined outputs of the integrating circuits I1, I2 and I3 are connected to a circuit switch S1 via the diodes 11, 12 and 13. The combined outputs of the integrating circuits I1, I2 and I3 control the operation of the circuit switch S1. The switch S1 is normally in its closed or conductive condition. The switch S1 may have the same structure as the switch S2. The input of the switch S1 is connected to the output of the indicator ID. The output of the switch S1 is connected to the set input of a flip flop KS. When one or more of the integrating circuits I1, I2 and I3 produces an output signal, said signal controls the switch S1 by switching it to its open or nonconductive condition, thereby disconnecting the indicator ID from the flip-flop KS.

The output of the flip-flop KS is connected in any suitable manner to circuit breakers for disconnecting the system to be protected from the remainder of the power system. The combined outputs of the differentiating circuits D1, D2 and D3 are connected to the reset input of the flip-flop KS via the diodes 1, 2 and 3 and the time delay $t2$. The delay period of the time delay $t2$ lasts somewhat longer than one period of the AC voltage. Therefore, after the disconnection of a preceding short circuit, when none of the differentiating circuits D1, D2 and D3 any longer produces an output signal, the flip-flop KS is reset. The flip-flop KS is reset after the expiration of one period, which prepares the differential protective circuit of the invention for operation.

When there is a short circuit within or without the range of protection, at least one of the differentiating circuits D1, D2 and D3 produces an output signal which is supplied to and switches the circuit switch S2 to its conductive or closed condition. The indicator ID is thus connected in the circuit to the outputs of the rectifiers G4, G5, G6 and G7. The indicator ID responds or does not respond, in accordance with the instantaneous magnitudes of the resultant sum current derived from the outputs of the rectifiers G4, G5, G6 and G7. During the first instant after the occurrence of a fault inside or outside the system to be protected, none of the saturable current transformers W1, W2 and W3 is yet saturated. This is, the voltage integral produced in the integrating circuits I1, I2 and I3 has not yet attained the magnitude required for the response of the limit circuits included in said integrating circuits.

Since none of the integrating circuits I1, I2 and I3 provides an output signal, the circuit switch S1 remains in its conductive or closed condition. When the fault occurs within the system to be protected, the release current predominates in the rectifier G7 and provides a response in the indicator ID. As a result, the flip-flop KS is switched to its set condition or is set via the circuit switch S1. The flip-flop KS then provides an output signal for operating the circuit breakers.

As soon as one of the three current transformers W1, W2 and W3 approaches the vicinity of its saturation limit, the integrating circuit I1, I2 or I3, connected to such transformer, produces an output signal which is delivered to the switch S1 and switches said switch to its nonconductive or open condition. Thus, the flip-flop KS remains in its set condition, regardless of the output signal of the indicator ID.

When a fault occurs outside the system to be protected, the current in the release direction becomes almost zero in magnitude at the onset of the fault via the as yet nonsaturated transformers W1, W2 and W3. The indicator ID thus is unable to produce an output signal. As soon as one of the current transformers W1, W2 and W3 is saturated, the signal supplied to the switch S1 from the integrating circuits I1, I2 and I3 switches said switch to its nonconductive or open condition. When the switch S1 is in its nonconductive condition, the indicator ID is disconnected from the flip-flop KS. Thus, although a resultant sum current, produced as a result of the saturation of a current transformer, is able to energize or operate the indicator ID, there is no control signal supplied to the circuit breakers or operating said circuit breakers.

There is a special advantage provided when the circuit switch S2 connects the indicator ID to the outputs of the rectifiers G4, G5, G6 and G7 in the range of each current zero passage, which is equal to the maximum current variation. This initiates a new indicating or measuring period in each period of the AC voltage. Thus, a fault or error occurring within the range of protection, which first appears after the occurrence of a fault outside said range of protection, is included in the measurement or indication.

When differential protective circuits are utilized for transformers, time delay members are included therein in order to prevent faulty release due to magnetizing current. This feature is no longer feasible in the rapid protection provided by the differential protective circuit of the invention. When the differential protective circuit of the invention is utilized for transformers, it is possible to provide each winding of a transformer with its own differential protective circuit. Both ends of each winding of each transformer may be connected to current transformers which produce the input magnitudes for the differential protective circuit.

The filter R2, C2 of the limit circuit GS2 of FIG. 2 may, of course, be connected in the same position in the limit circuit GS1 so that the limit circuits GS1 and GS2 may be identical.

While the invention has been described by means of a specific example and in a specific embodiment, we do not wish to be limited thereto, for obvious modifications will occur to those skilled in the art without departing from the spirit and scope of the invention.

We claim:

1. A differential protective circuit for a system to be protected comprising a plurality of saturable current transformers having secondary windings and primary windings connected to outputs of the system to be protected; summing means connected to the secondary windings of the current transformers for producing the algebraic sum of the currents flowing into the system to be protected and providing an electrical magnitude in accordance with said sum; indicator means having an input electrically connected to the summing means and an output for providing an output signal at its output for disconnecting the system to be protected from a power supply in accordance with said electrical magnitude; circuit means connected to the secondary windings of the current transformers for indicating transformer saturation and including limit circuit means; a first circuit switch connected to the output of the indicator means for controlling the provision of the output signal of said indicator means for disconnecting the system to be protected; and first switch control means connected to the limit circuit means of said circuit means for controlling the conductivity condition of the first circuit switch, said first switch control means including OR gate means connected between said limit circuit means and said first circuit switch for switching said first circuit switch to its nonconductive condition when one of said current transformers becomes saturated.

2. A differential protective circuit as claimed in claim 1, wherein said circuit means comprises a plurality of integrating circuits each connected to the secondary winding of a corresponding one of the current transformers and a plurality of limit circuits each connected to a corresponding one of the integrating circuits whereby each of the current transformers provides a corresponding one of the integrating stages with an electrical magnitude proportional to the voltage of the secondary winding thereof, each of the limit circuits of said circuit means having a response magnitude adjusted in accordance with the permissible limit value of the voltage integral relative to time and determined by the onset of transformer saturation.

3. A differential protective circuit as claimed in claim 2, wherein said circuit means includes a plurality of filters each connected between the secondary winding of a corresponding one of the current transformers and a corresponding one of the limit circuits for filtering out harmonics.

4. A differential protective circuit as claimed in claim 2, further comprising additional circuit means connected to the secondary windings of the current transformers for differentiating signals in said secondary windings, said additional circuit means including additional limit circuit means, a second circuit switch connected between the summing means and the input of the indicator means for controlling the provision of said electrical magnitude to said indicator means, and second switch control means connected to the limit circuit means of said additional circuit means for controlling the conductivity condition of said second circuit switch, said second switch control means including additional OR gate means connected between said limit circuit means and said second circuit switch for switching said second circuit switch to its conductive condition in accordance with the differential quotient of the secondary current of the current transformers.

5. A differential protective circuit as claimed in claim 4, wherein said additional circuit means comprises a plurality of differentiating circuits each connected to the secondary winding of a corresponding one of the current transformers and a plurality of additional limit circuits each connected to a corresponding one of the differentiating circuits.

* * * * *